United States Patent [19]
O'Neill

[11] Patent Number: 5,817,979
[45] Date of Patent: Oct. 6, 1998

[54] BOND BAR FOR AN ELECTRICAL CABLE SPLICE

[75] Inventor: Andrew J. O'Neill, Cordova, Tenn.

[73] Assignee: Thomas & Betts Corporation, Memphis, Tenn.

[21] Appl. No.: 435,061

[22] Filed: May 8, 1995

Related U.S. Application Data

[63] Continuation-in-part of Ser. No. 373,357, Jan. 17, 1995, Pat. No. 5,613,298.

[51] Int. Cl.$^6$ .................................................. H01R 4/22
[52] U.S. Cl. .................................... 174/84 C; 174/93
[58] Field of Search ................. 174/73.1, 78, 84 R, 174/84 C, 88 B, 91, 92, 93; 29/869, 870, 871

[56] References Cited

U.S. PATENT DOCUMENTS

| | | | |
|---|---|---|---|
| 3,887,239 | 6/1975 | Engle | 303/128 |
| 3,960,430 | 6/1976 | Bunnell et al. | 174/84 C X |
| 4,360,083 | 11/1982 | Weisman | 188/72.5 |
| 4,554,401 | 11/1985 | Ball | 174/93 X |
| 4,773,157 | 9/1988 | Galloway et al. | 174/84 R X |
| 4,923,056 | 5/1990 | Nedelk | 188/71.1 |
| 4,986,610 | 1/1991 | Beck et al. | 303/93 |
| 5,168,963 | 12/1992 | Ponciuz | 188/72.5 |
| 5,172,960 | 12/1992 | Chareire | 303/9.61 |
| 5,217,282 | 6/1993 | Guichard | 303/9.73 |
| 5,293,966 | 3/1994 | Chareire | 188/156 |
| 5,297,856 | 3/1994 | Asauo | 303/9.61 |
| 5,405,477 | 4/1995 | Arnold | 156/304.3 |

FOREIGN PATENT DOCUMENTS

| | | |
|---|---|---|
| 0329373A1 | 8/1989 | European Pat. Off. . |
| 0384071A1 | 8/1990 | European Pat. Off. . |
| 0443213A2 | 8/1991 | European Pat. Off. . |

OTHER PUBLICATIONS

Ice, Intercity Express–Facts and Aspects, published by Verband der Deutschen, Bahnindustrie e.V. (VDB), Lindenstrasse 30 3–6000 Frankfurt/Main 1, Germany, 4 pages, Dec. 1992.

Rolling Stock Parts, Sumitomo Metal Industries, Ltd., 5 pages, 1991.

*Primary Examiner*—Kristine L. Kincaid
*Assistant Examiner*—Marc D. Machtinger
*Attorney, Agent, or Firm*—Hoffmann & Baron, LLP

[57] ABSTRACT

A bond bar assembly spans an electrical cable splice. The bond bar assembly includes a conductive bond bar having opposed ends and a longitudinal central extent which spans the cable splice. Each end of the bond bar has a generally planar surface for engagement with the cable. A radially contractable clamping member is securable about the cable and about the planar surface of each bond bar end for securing the bond bar ends to the cable. The planar surface of each bond bar end includes a deflectable jacket skiving member which is deflectably movable from a first position in non-skiving engagement with the jacket of the cable to a second position in skiving engagement with the cable jacket upon the radial contraction of the clamping member. Such arrangement positionally confines and secures the bond bar with respect to the cable.

9 Claims, 11 Drawing Sheets

BOND BAR FOR AN ELECTRICAL CABLE SPLICE

CROSS REFERENCE TO RELATED APPLICATIONS

This is a continuation-in-part of U.S. patent application Ser. No. 08/373,357 filed on Jan. 17, 1995, U.S. Pat. No. 5,613,298 and entitled "Forced Encapsulation Cable Splice Enclosure".

BACKGROUND OF THE INVENTION

The present invention relates generally to a method and apparatus for sealably enclosing a splice in an electrical cable. More particularly, the present invention relates to an improved bond bar for spanning the cable splice prior to enclosing the splice.

FIELD OF THE INVENTION

Electrical cables, especially telecommunications cables are typically run outdoors, either suspended overhead or buried underground. In order to effect repairs to the individual conductors within the cable, or to make interconnections thereto, the integrity of the cable must be violated. Once repairs or interconnections are accomplished, the exposed area of the cable, commonly referred to as a cable splice, must be resealed in order to protect the conductors against the outdoor environment.

Many techniques are currently known for sealably covering cable splices. One particularly effective technique is to use a cable splice closure, which includes an enclosure filled with an encapsulant which fully surrounds the splice to seal the splice against moisture penetration which is prevalent in outdoor environments. These encapsulants are typically provided in a semi-fluid state and poured into the enclosure over the cable splice. The encapsulant may be forced into the enclosure under pressure so that the encapsulant fully surrounds the cable splice and fills the interstices between conductors. The encapsulant then cures to a gel-like consistency to effectively seal the splice.

In order to retain the encapsulant under pressure prior to curing, the ends of the enclosure must be sealed. End seals generally fall into two categories. The first type of end seals which may be used in combination with splice enclosures are rigid end seals. These end seals are clamped in sealed fashion to spaced apart locations on the cable on either side of the splice. The splice enclosure is then sealably secured to the end seals at each end thereof. Rigid end seals of this type provide an effective technique for sealably closing the opposed ends of a splice enclosure so as to resist moisture intrusion, as well as retain encapsulant which is forced into the enclosure. An example of rigid end seals used in combination with a cable splice enclosure is shown in U.S. Pat. Nos. 5,245,133 and 5,251,373. While extremely effective, these rigid end seals are multi-component devices requiring skilled installation.

A second approach is to employ sealing collars or dams about the cable on either side of the splice. Each sealing dam may be formed, for example, by wrapping mastic tape around the cable to form a buildup of mastic about which the ends of the enclosure may be positioned. The mastic provides for good sealing contact with cable as well as with the enclosure. The mastic tape, while sufficiently viscous to permit wrapping and positioning about the cable, does exhibit some degree of flow. While this permits good compressive engagement to be made, it does make secure-ment of the cover around the dams more difficult. The enclosure is typically secured by applying a compression strap over the enclosure about the sealing dams as well as at other locations. However, compression of the straps may tend to cause movement of the mastic. Also, upon forcing encapsulant into the enclosure, the mastic sealing dams have a tendency to migrate out from the enclosure due to the internal pressure applied by the encapsulant. In order to prevent this tendency, the craftsperson must secure the sealing dams to the ends of the enclosure. This is typically accomplished by wrapping the ends of the enclosure and the cable adjacent the sealing dams with a sealing tape. As can be seen, this requires additional steps as well as additional materials which must be carried by the installer. Further, the integrity of such a tape-wrapped assembly is extremely craft-sensitive and cannot always be assured.

In addition, as is common in many splice applications, the installer must also reestablish the ground continuity across the cable splice. This is typically accomplished by use of a ground bar which is anchored to the cable jacket on either side of the splice. Typically, hose clamps are used to secure the ground bar to the cable jacket. However over time it has been found that the securement of the ground bar to the cable jacket may become loose as the ground bar has a tendency to pull away from the cable jacket. This may result in an ineffective ground connection being maintained across the cable splice.

It is therefore desirable to provide a cable splice enclosure including a ground bar which effectively spans the cable splice and maintains ground continuity across the splice during long term use.

SUMMARY OF THE INVENTION

It is an object of the present invention to provide a method and apparatus for effecting an electrical cable splice.

It is a further object of the present invention to provide a bond bar assembly for spanning a splice in electrical cable, the bond bar assembly establishing ground continuity across the splice.

It is a still further object of the present invention to provide a bond bar assembly for a cable splice which may be easily applied across the splice and which maintains engagement with the cable over long term use.

In the efficient attainment of these and other objects, the present invention provides an improved bond bar assembly for an electrical cable. The cable includes a plurality of conductors extending therethrough and insulative jacket thereover. An exposed splice location is defined between ends of the cable jacket. The bond bar assembly comprises an elongate conductive bond bar having opposed ends and a longitudinal central extent for spanning the splice location. The bond bar ends each include a generally planar surface for engagement with the cable jacket ends. Radially contractable clamping members are securable about the jacket ends and the planar surface of the bond bar ends for securing the bond bar ends to the jacket ends. Each planar surface of the bond bar ends includes a deflectable jacket skiving member deflectable movable from a first position in non-skiving engagement with the cable jacket end to a second position in skiving engagement with the cable jacket end upon radial contraction of the clamping member.

As more particularly described by way of the preferred embodiment herein, the bond bar ends accommodate a cable tie as the radially contracting clamping member. The jacket skiving member includes a distally located barb which is movable into skiving engagement with the cable jacket upon tightening of the cable tie around the jacket end. Such engagement prevents migration of the bond bar with respect to the cable jacket over long term use.

DETAILED DESCRIPTION OF THE PREFERRED EMBODIMENTS

Figure 1:
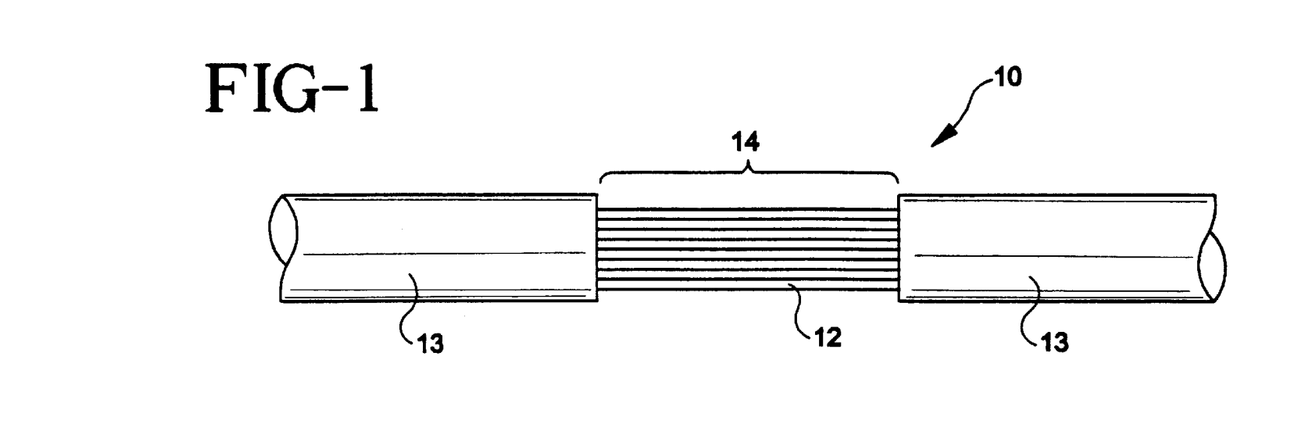
FIG. 1 is a side elevational view of a portion of an electrical cable having an exposed central area referred to as a cable splice.

Referring to FIG. 1, an extent of telecommunications cable 10 is shown. Cable 10 includes a plurality of individually insulated electrical conductors 12 extending through an outer insulative cable jacket 13. Conductors 12, which are of conventional construction, each being formed of copper and having plastic insulation thereover, are shown schematically. A portion of cable jacket 13 is typically broken away to create an exposed area 14, which permits access to conductors 12 for repairs, maintenance, or to splice additional conductors thereto in a manner which is well-known in the art. The exposed area 14 is created by cutting away a portion of jacket 13. The exposed area 14 and the repairs or splices made thereat is typically referred to as a cable splice or cable splice location, and these terms may be used interchangeably to describe the exposed area 14 of cable 10. After effecting repairs or splices to the cable, the cable splice 14 must be covered for protective purposes. The description which follows sets forth the preferred method and apparatus of the present invention for sealably covering cable splice 14.

Figure 2:
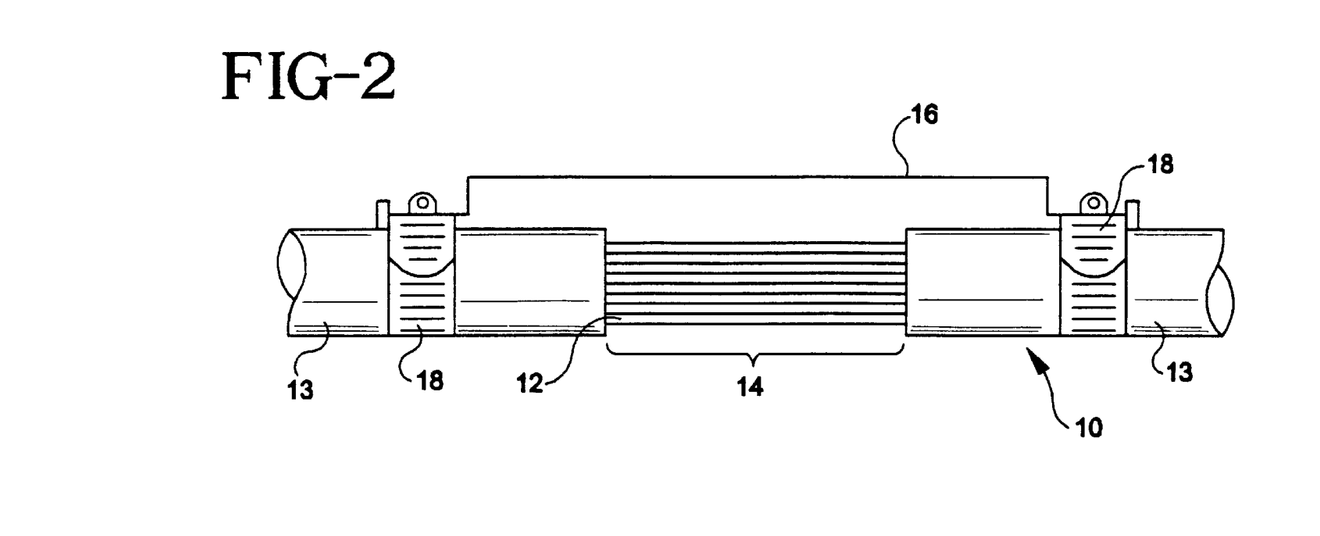
FIG. 2 is a side elevational showing of the electrical cable of FIG. 1 with a stabilizing bar being positioned across the cable splice.

Referring now to FIG. 2, the present invention employs a stabilizer bar 16, which is constructed of length sufficient to span splice 14. Stabilizer bar 16 is formed of a sufficiently rigid material such as metal, and is anchored to the cable jacket 13 on either side of splice 14. Compression clamps 18 or other compressive fastening members may be used to secure stabilizer bar 16 to jacket 13 of cable 10. Stabilizer bar 16 provides structural stability to splice 14, preventing sharp bending thereat which could adversely affect the connections or repairs made to splice 14. Also in certain situations, stabilizer bar 14 may also function as a ground strap assuring electrical ground continuity across splice 14. At a stage either prior to or after installation of stabilizer bar 16, repairs, maintenance or splices may be made to conductors 12 at splice 14. These repairs or splices may be accomplished in a manner well known in the art.

Figure 3:
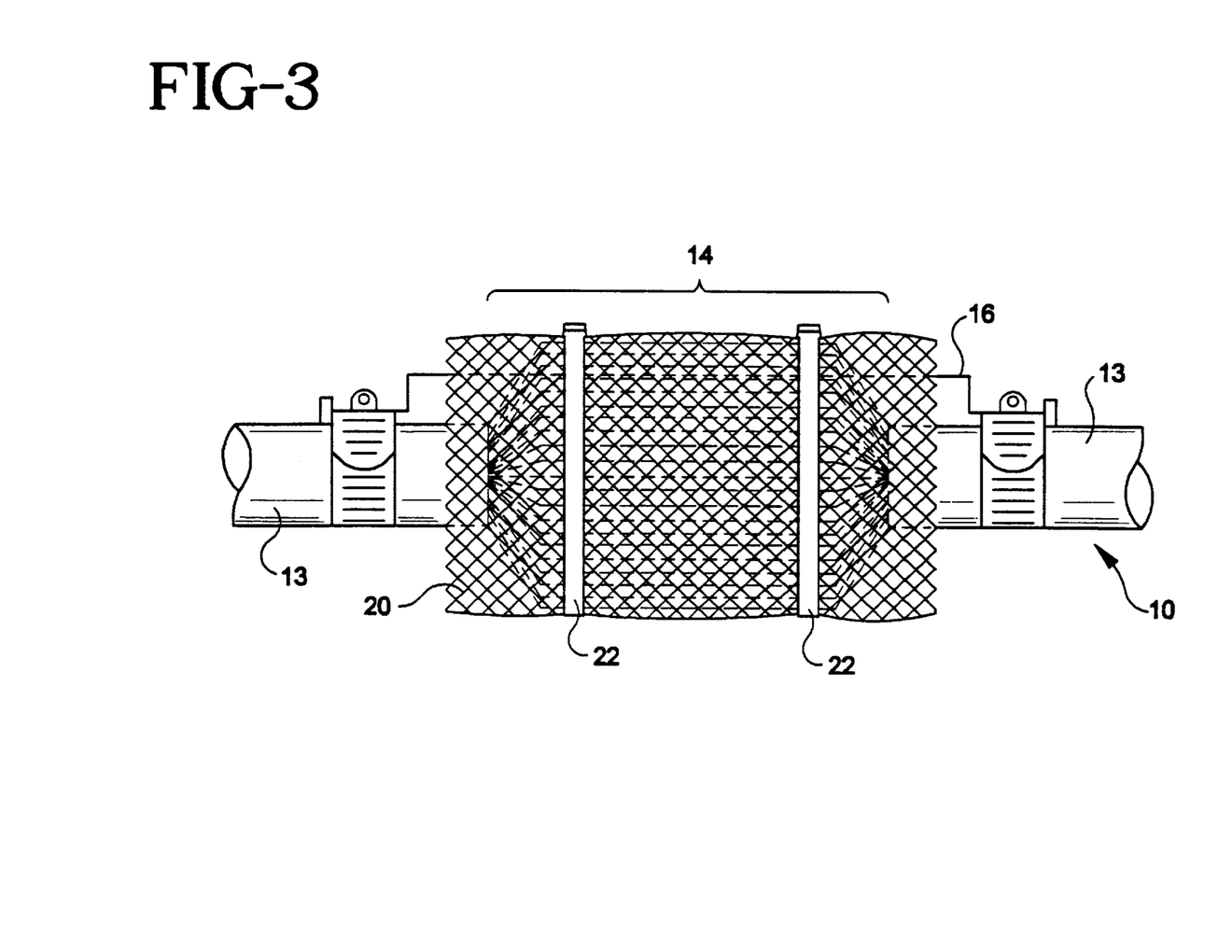
FIG. 3 shows the cable of FIG. 1 with a spacer web positioned about the cable splice.

Referring to FIG. 3, splice 14 is covered with a spacer web 20. Web 20 is generally a mesh-like member which is wrapped around splice 14 and secured thereto using cable ties 22 or other fastening members. As will be described in further detail hereinbelow, spacer web 20 permits the effective encapsulation of splice 14 with a curable encapsulant. Spacer web 20 is of the type which is shown and described in commonly assigned U.S. Pat. No. 4,685,891 issued on Aug. 11, 1987, entitled "Method and Apparatus for Providing a Spacer to a Cable Splice".

Figure 4:
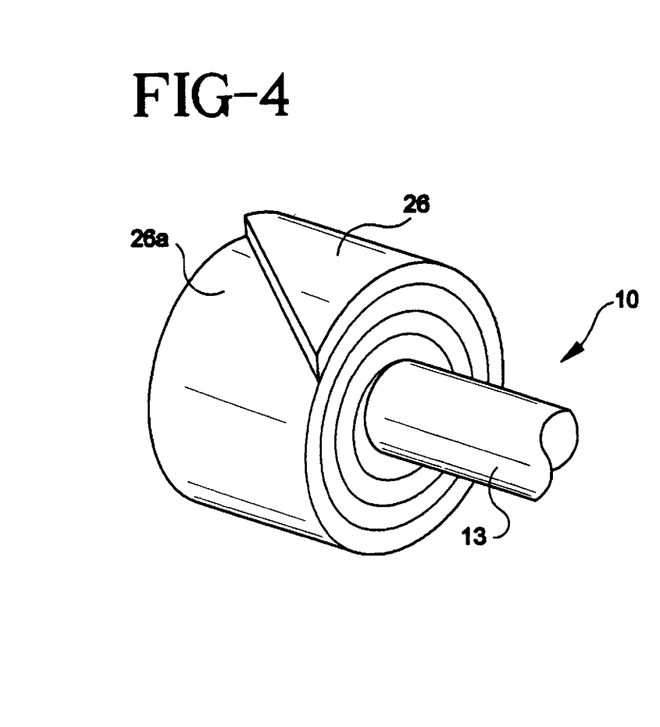
FIG. 4 shows a portion of the electrical cable of FIG. 1 adjacent one side of the splice, with a foam end seal being placed therearound.
Figure 5:
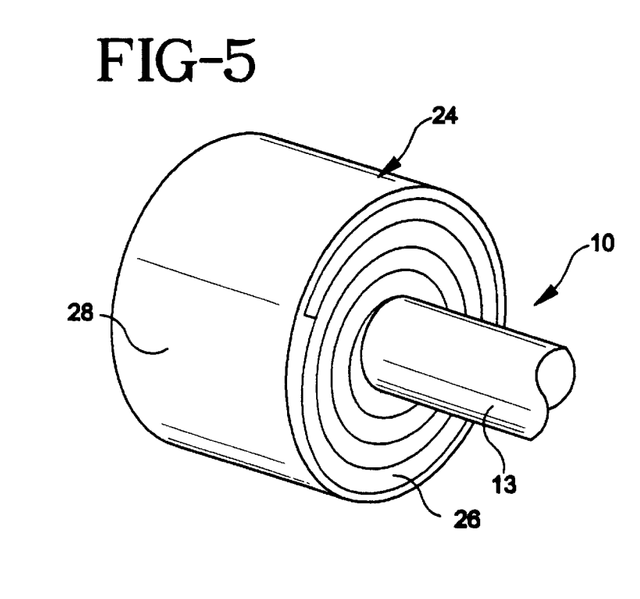
FIG. 5 shows the cable portion of FIG. 4 with a mastic tape placed about the foam end seal.

Referring now to FIGS. 4 and 5, construction of end seals or sealing dams 24 (FIG. 5) may be described. As sealing dams 24 are formed about cable jacket 13 on each side of splice 14 in an identical manner, only formation of one sealing dam 24 will be described with reference to FIGS. 4 and 5. Sealing dam 24 is initially constructed by employing a closed cell foam 26 which may be provided in roll form. Foam 26 is generally a compressible, closed cellular structure. Foam 26 may include adhesive backing on one or both longitudinal planar surfaces 26a, so as to permit the foam to be adhesively wrapped about cable jacket 13. The adhesive surfaces 26a, which may be exposed by removal of release liners (not shown), permit the foam 26 to be adhesively secured to the cable as well as to itself when wrapped therearound. In preferred construction, the foam is wrapped about the cable jacket 13 until the built up diameter of the wraps of foam is larger than the diameter of the splice 14.

Referring to FIG. 5, after the foam 26 is properly positioned about cable jacket 13, a wrapping of mastic tape 28 may be placed thereover. Mastic tape 28 is formed of a tacky, generally compressible mastic which may be supplied in a tape-like rolled form. The mastic tape 28 is wrapped about the foam 26 to further increase the circumference of the sealing dam 24. As shown in FIG. 5, a combination of a foam wrap and a mastic wrap forms sealing dam 24. While this combination is shown as the preferred construction, it is contemplated that other constructions may also be formed. Constructions such as successive alternating wraps of tape and foam may be employed. The present invention further contemplates the use of foam 26 or mastic tape 28 alone to form sealing dam 24. However, as will be described in further detail hereinbelow, it has been found that the combination of a first layer of foam 26 with a wrapping of mastic tape 28 thereover provides superior end sealing, as well as structural integrity.

Figure 6:
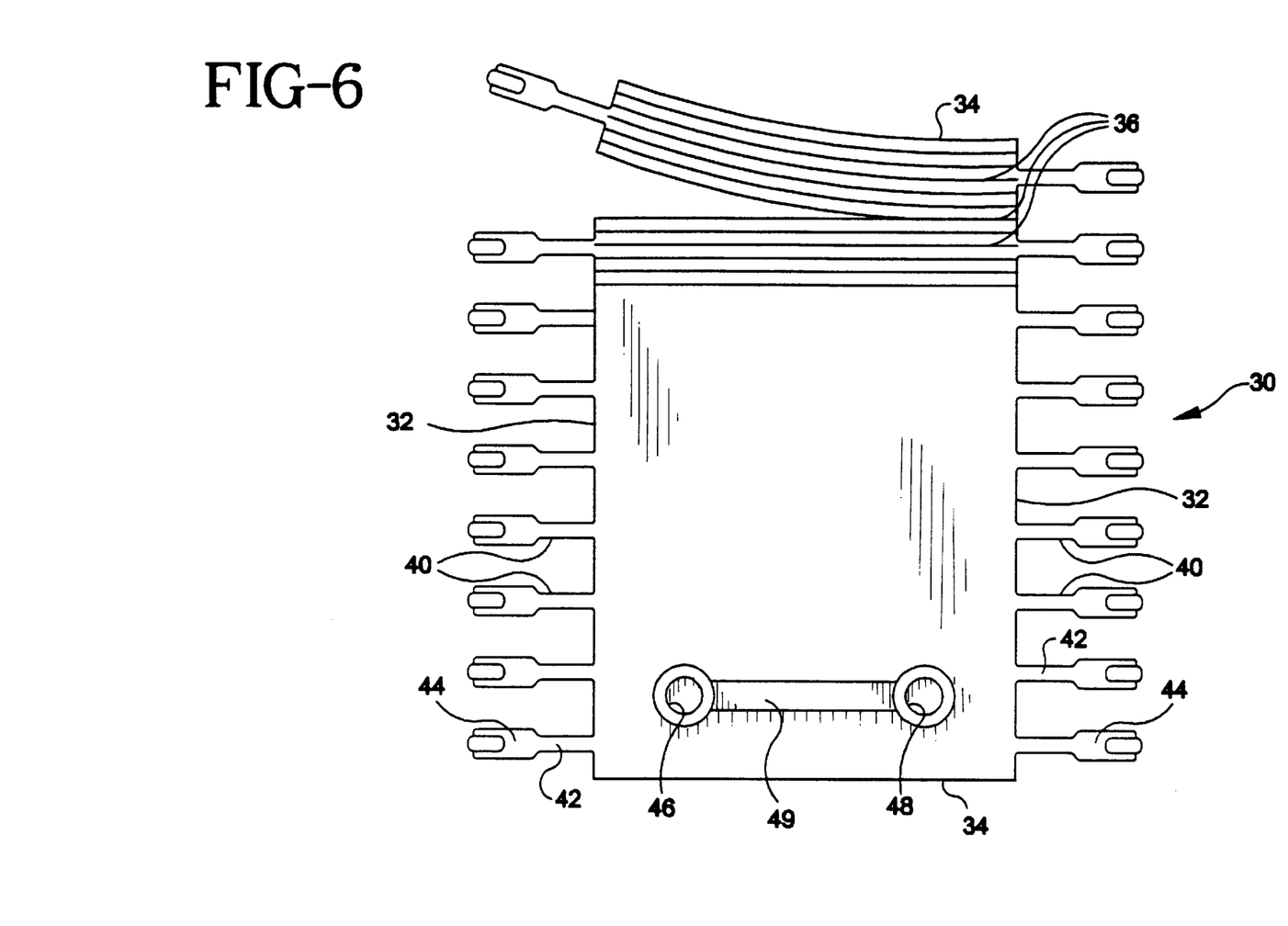
FIG. 6 shows the splice enclosure shell of the present invention used to cover the cable splice shown in FIG. 5.

Referring now to FIG. 6, cable enclosure shell 30 of the present invention is shown. Shell 30 is an elongate flexible planar sheet of plastic material. Shell 30 is generally rectangular, having opposed longitudinal edges 32 and opposed transverse edges 34. The distance between longitudinal edges 32 is constructed so that shell 30 spans cable splice 14 (FIG. 3). In use, shell 30 is wrapped in a cylindrical manner with opposed transverse edges 34 overlapping to form an elongate split unitary cylindrical structure (FIG. 7) having opposed open ends 32a defined by rolled longitudinal edges 32.

Other constructions of shell 30 are also within the contemplation of the present invention. Hard shells having upper and lower shell halves such as those shown in the above identified '133 and '373 patents may also be employed. However, the flexible shell 30 shown herein has particular utility as it permits use on cable splices 14 of various diameters.

As the diameter of splice 14 may vary depending upon the amount of repairs or interconnections conducted thereat, the length of the planar sheet forming shell 30 may be varied. Shell 30 includes a plurality of longitudinally spaced transversely extending score lines 36, along which shell 30 may be cut or torn to vary the length of the shell. An appropriate cutting tool (not shown) may be used to cut or tear the shell 30 along one of score lines 36.

For purposes which will be described in further detail hereinbelow, shell 30 includes a plurality of spaced fingers 40. Fingers 40 extend outwardly from longitudinal edges 32. In the preferred embodiment, fingers 40 are integrally formed with shell 30. Also as shown, each finger 40 includes a narrow proximal portion 42 immediately extending from longitudinal edge 32 and a wider distal portion 44, spaced from longitudinal edge 32.

Shell 30 further includes an inlet port 46 and a transversely spaced outlet port 48 therethrough. Ports 46 and 48 may be formed integrally with the formation of shell 30 or may be placed in shell 30 after formation thereof. In the present illustrative embodiment, an integrally formed structural reinforcing member 49 spans the space between ports 46 and 48. The use of ports 46 and 48 will be described in further detail hereinbelow.

Figure 7:
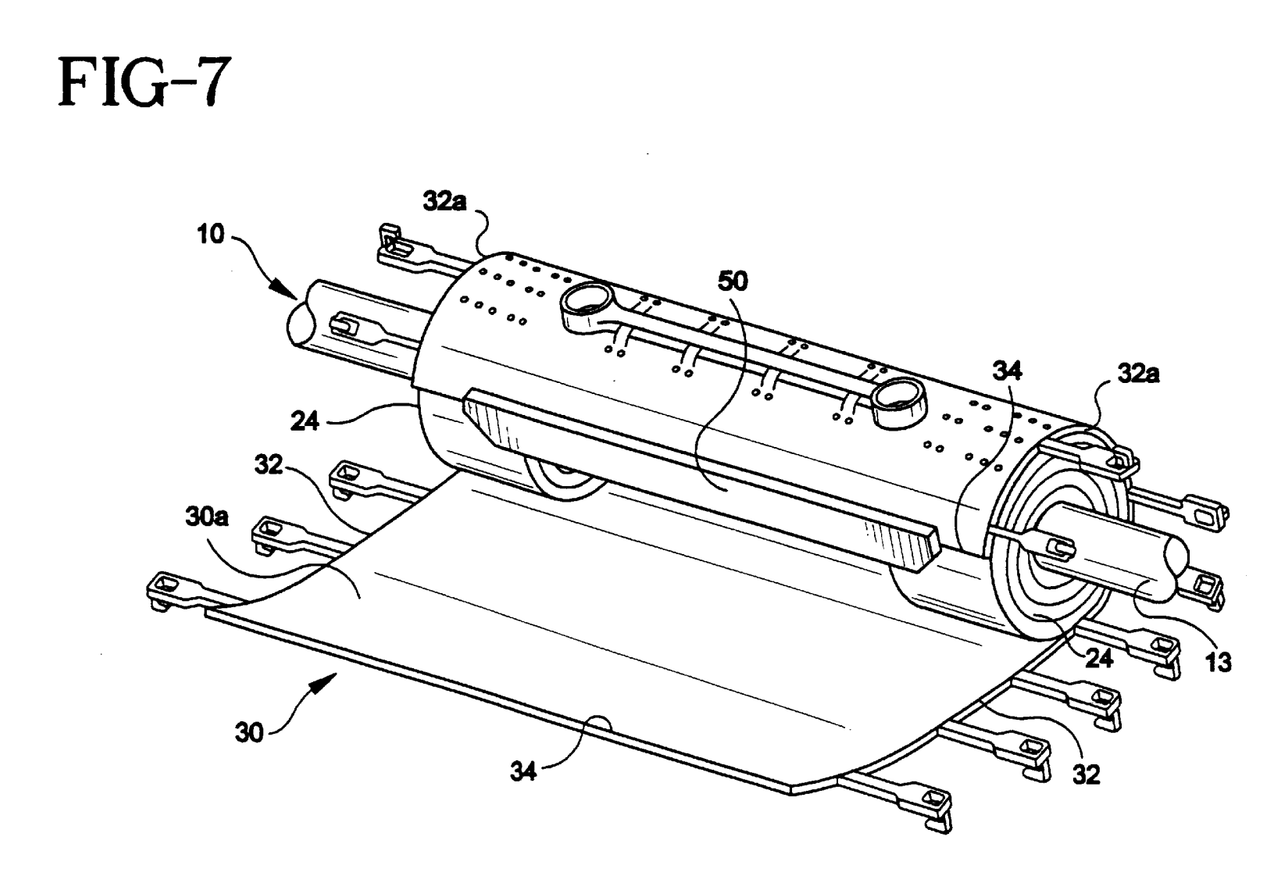
FIG. 7 shows the splice enclosure shell of FIG. 6 partially wrapped about the cable splice.

Referring more specifically to FIG. 7, shell 30 may be wrapped around cable splice 14. After shell 30 is cut to the desired length, the shell 30 is positioned about splice 14 with one planar surface 30a positioned in contact with sealing dams 24. The shell is positioned so that sealing dams 24 are adjacent longitudinal edges 32 of shell 30. In this manner, when shell 30 is formed into a cylindrical structure, sealing dams 24 close open ends 32a thereof. Shell 30 is positioned so that opposed transverse edges 34 overlap. A strip of gasketing material 50 may be interposed between the overlapped edges 34. Any suitable gasketing material may be employed. In fact, it is contemplated that either or both of strips of foam 26 or mastic tape 28 may be employed as a sealing gasket. When properly overlapped, shell 30 forms a unitary cylindrical enclosure 52 about splice 14 (FIG. 8) with sealing dams 24 closing opposed open ends 32a thereof.

In order to retain shell 30 in a closed cylindrical construction, a plurality of radially compressive retaining straps 54 may be positioned therearound. One or more of the straps 54a is positioned directly over each of sealing dams 24. In this manner, tight compressive engagement is maintained between shell 30 and sealing dam 24 adjacent open end 32a.

The present construction of sealing dams 24, as above described, formed with a combination of closed cell foam 26 and mastic tape 28, provides a superior seal at open ends 32a of shell 30. While tight compressive engagement must be maintained between shell 30 and sealing dams 24, overcompression caused by tightening of straps 54a thereat has a tendency to cause compressive flow or movement of dams 24. The above described combination of foam 26 and mastic tape 28 provides sufficient rigidity to sealing dams 24, reducing this tendency.

Figure 8:
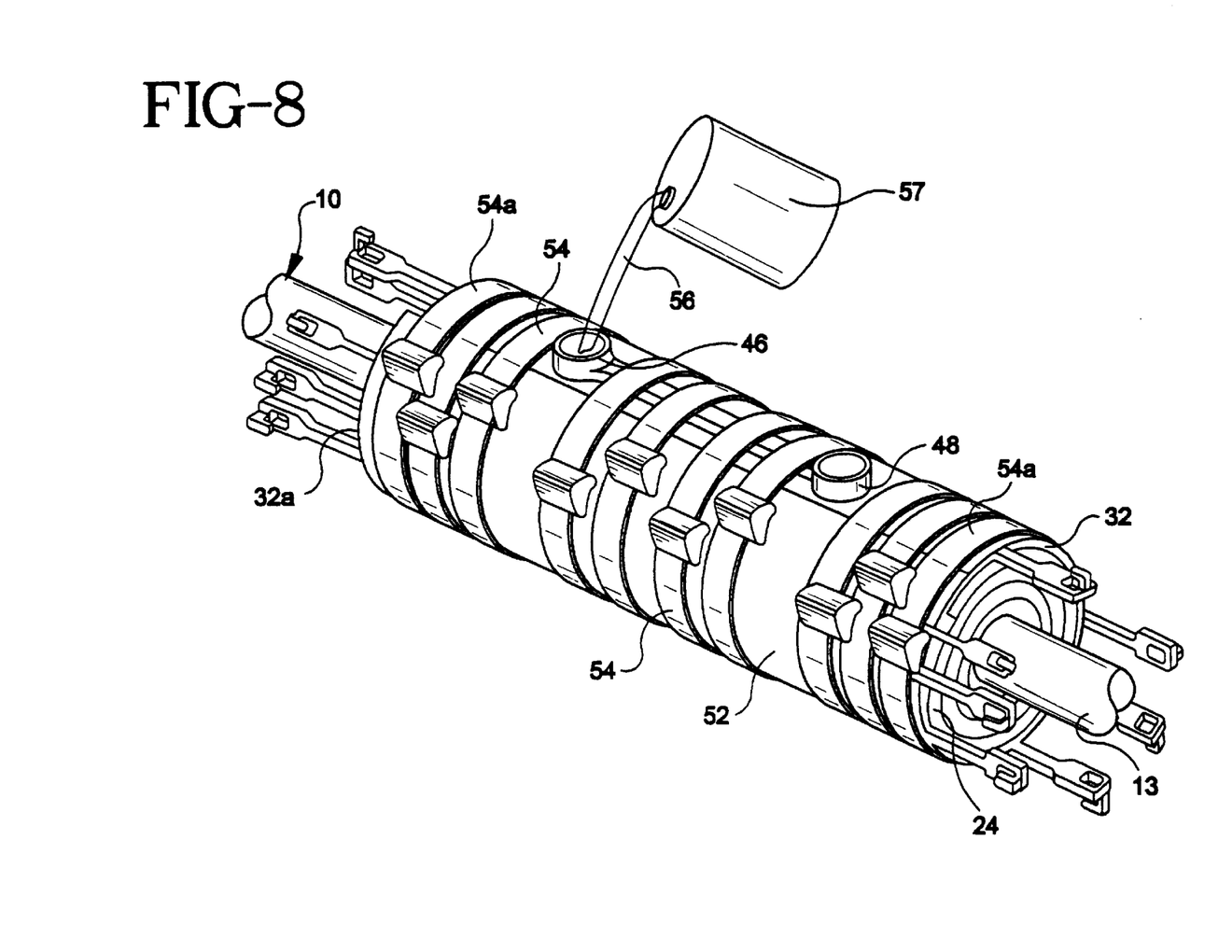
FIG. 8 shows the splice enclosure shell of FIG. 6 positioned about the cable splice with encapsulant being poured thereinto.

Having constructed enclosure 52 about splice 14, effective sealing of the splice 14 may be achieved by introducing an encapsulant 56 into enclosure 52. In order to effectively seal splice 14 and to ensure that the encapsulant seals between the intersticial spaces of the individual insulated conductors 12, the encapsulant 56 may be injected into enclosure 52 under pressure. A method and apparatus for encapsulating a cable splice under pressure is shown and described in above-mentioned U.S. Pat. No. 5,245,133 issued Sep. 14, 1993, entitled "Moisture Resistant Cable Splice and Sealing Structure Thereof" and U.S. Pat. No. 5,251,373 issued Oct. 12, 1993, entitled "Method for Protection of Cable Splice". These patents are incorporated herein by reference.

In the preferred embodiment shown herein, encapsulant 56 is poured into enclosure 52 from a suitable container 57 through inlet port 46. The encapsulant may be applied under pressure or may be subsequently pressurized. Spacer web 20 (FIG. 3) permits encapsulant to flow completely around splice 14. Outlet port 48 serves to permit the escape of air to allow enclosure 52 to be filled with encapsulant 56. Outlet port may also serve to permit escape of some encapsulant providing indication that the enclosure is filled. Alternatively, a pressure relief valve (not shown) may be interposed in outlet port 48 in a manner taught in the above-referenced '133 and '373 patents. As the encapsulant 56 is forced into enclosure 52 under pressure, there is a tendency for the encapsulant to exert outward pressure on sealing dams 24 closing open ends 32a of shell 30. Such outward pressure may be sufficient to cause migration of the sealing dams 24 out from the open ends 32a of shell 30. In order to prevent such outward migration, sealing dams 24 are retained by extending fingers 40.

Figure 9:
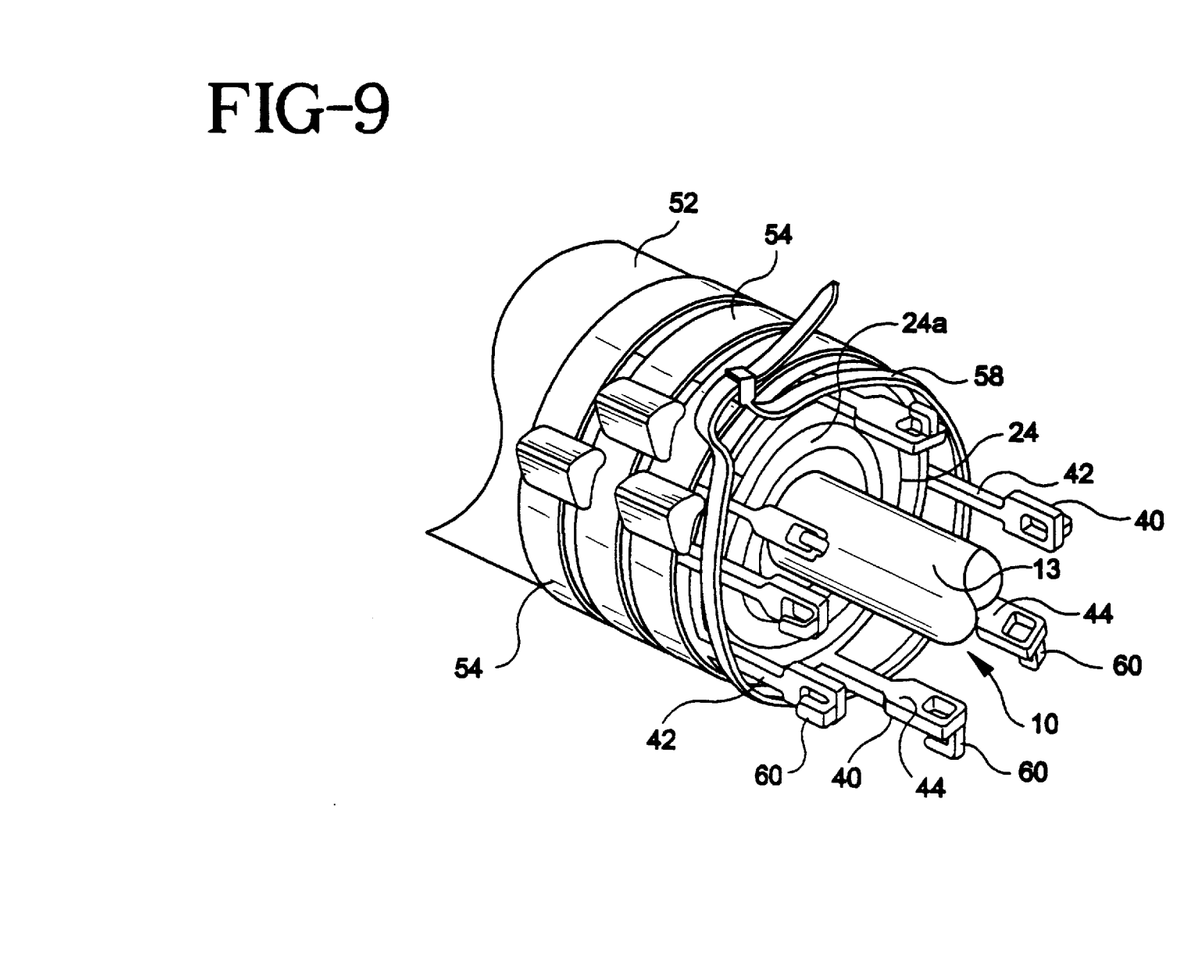
FIG. 9 shows a portion of the splice enclosure of FIG. 8, with extending shell fingers being securable to the cable.

Referring to FIG. 9, a cable tie 58 or other radially-compressive fastening member is looped around cable jacket 13 and extending fingers 40 which extend circumferentially about jacket 13. The cable tie 58 is tightened so that the tie comes in contact with distal portions 44 of fingers 40. Each of distal portions 44 includes an outwardly extending retaining element 60, which is preferably in the shape of a reverse hook. While hook-shaped retaining elements 60 are shown as the preferred technique for supporting and retaining cable tie 58, other techniques may also be employed. Retaining elements 60 serve to support cable tie 58. The cable tie 58 may be threaded or snapped into the hook-shaped retaining elements 60.

Figure 10:
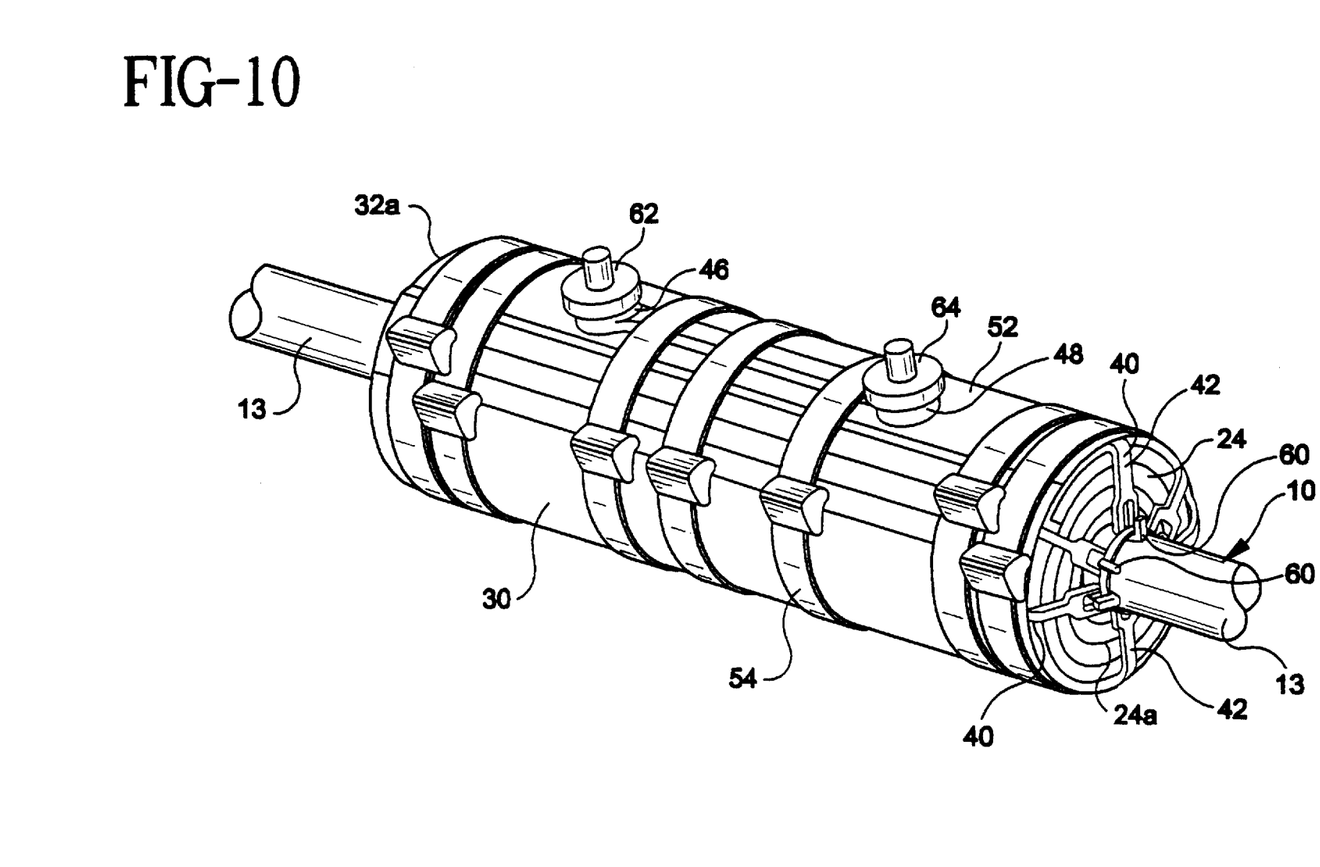
FIG. 10 shows the completed splice enclosure of the present invention secured to the electrical cable.

As seen in FIG. 10, the cable tie 58 is then tightened, preferably by hand, about cable jacket 13. In this manner, the proximal portions 42 of fingers 40 are positioned along an exterior annular surface 24a of sealing dams 24. The cable tie 58 being retained by retaining elements 60, secures the fingers 40 to cable jacket 13 outwardly adjacent sealing dam 24 preventing movement thereof. Such engagement prevents outward migration of sealing dam 24 upon the forced encapsulation of splice 14.

As described in the above referenced incorporated patents, the encapsulant 56 cures to a gel-like consistency, establishing a moisture barrier in a relatively short period of time (about one hour). Therefore, it is only necessary for the fingers 40 to positionally confine sealing dams 24 until such time as the encapsulant cures and no further pressure is exerted upon sealing dams 24. After encapsulant 56 cures plugs or caps 62 and 64 may be interposed in ports 46 and 48 to close off the ports.

As is shown and described with respect to FIG. 2 hereinabove, prior to splicing conductors 12, a stabilizer bar 16 is placed across splice 14 and anchored to the cable jacket at either end thereof. Stabilizer bar 16 serves two functions. First, it provides structural stability across splice 14 protecting the splice which could be damaged by the bending or twisting of the cable. Second, stabilizer bar 16 serves to reestablish the ground continuity of cable 10 across splice 14. While not shown in the drawings, cable 10 typically includes a metallic ground shield extending about conductors 12 within cable jacket 13. The ground shield must be severed to effect the splicing of conductors 12 at splice 14. In order to reestablish the integrity of the ground shield, the metallic stabilizer bar 16 is electrically attached to the shield on either side of the splice.

The technique for establishing electrical continuity across the splice is well known in the cable splicing art and is not described in detail herein. Appropriate hardware is used to establish such electrical connection with the shield of the cable. By reestablishing ground continuity across splice 14, stabilizer bar 16 further protects the installer from potential electrical surges through conductors 12 during the splicing process.

In addition to being electrically coupled to the metallic shield of the cable, stabilizer bar 16 is also mechanically coupled across the splice to the cable jacket 13 on either side of splice 14. Such mechanical coupling is shown in FIG. 2 by way of conventional hose clamps 18. Hose clamps 18 accommodate the opposed ends of stabilizer bar 16 and grip around cable jacket 13. The metallic hose clamps may partially dig into the plastic jacket 13 of cable 10 securing the stabilizer bar in place across splice 14.

Figure 11:
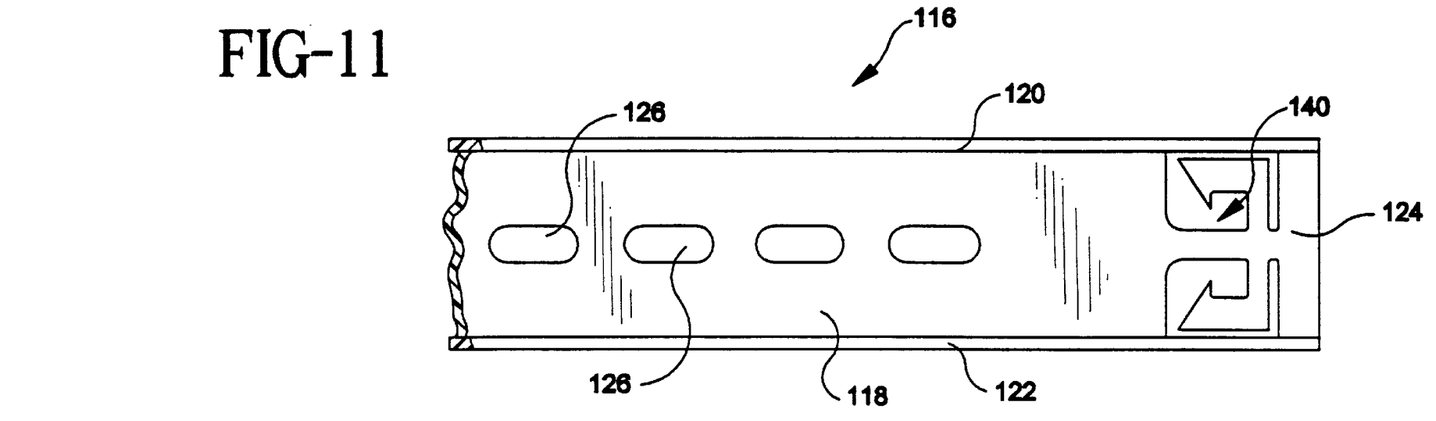
FIG. 11 is a top plan view, partially in section, of a portion of an improved bond bar of the present invention.
Figure 12:
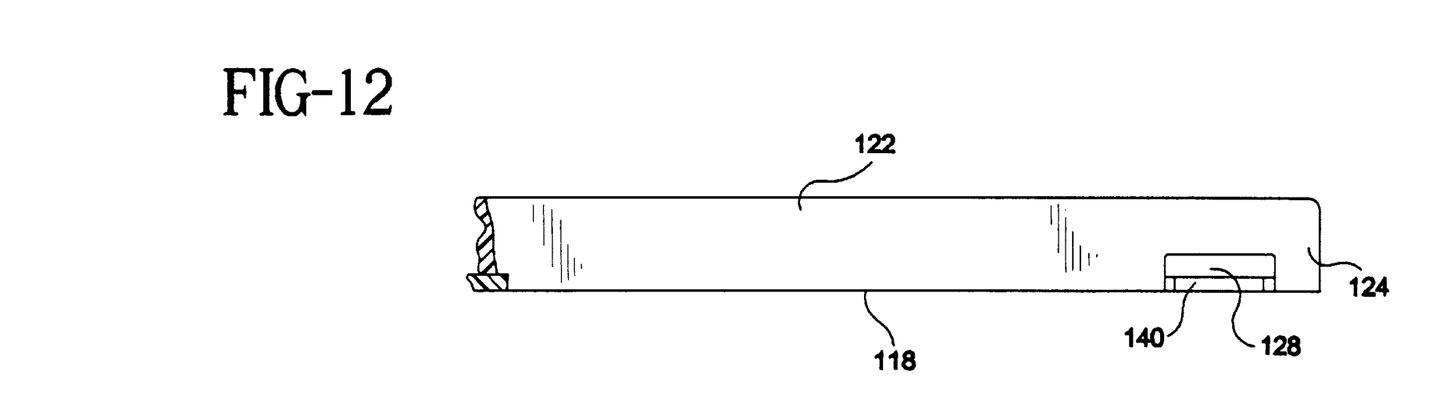
FIG. 12 is a side elevational showing partially in section of the bond bar of FIG. 11.
Figure 13:
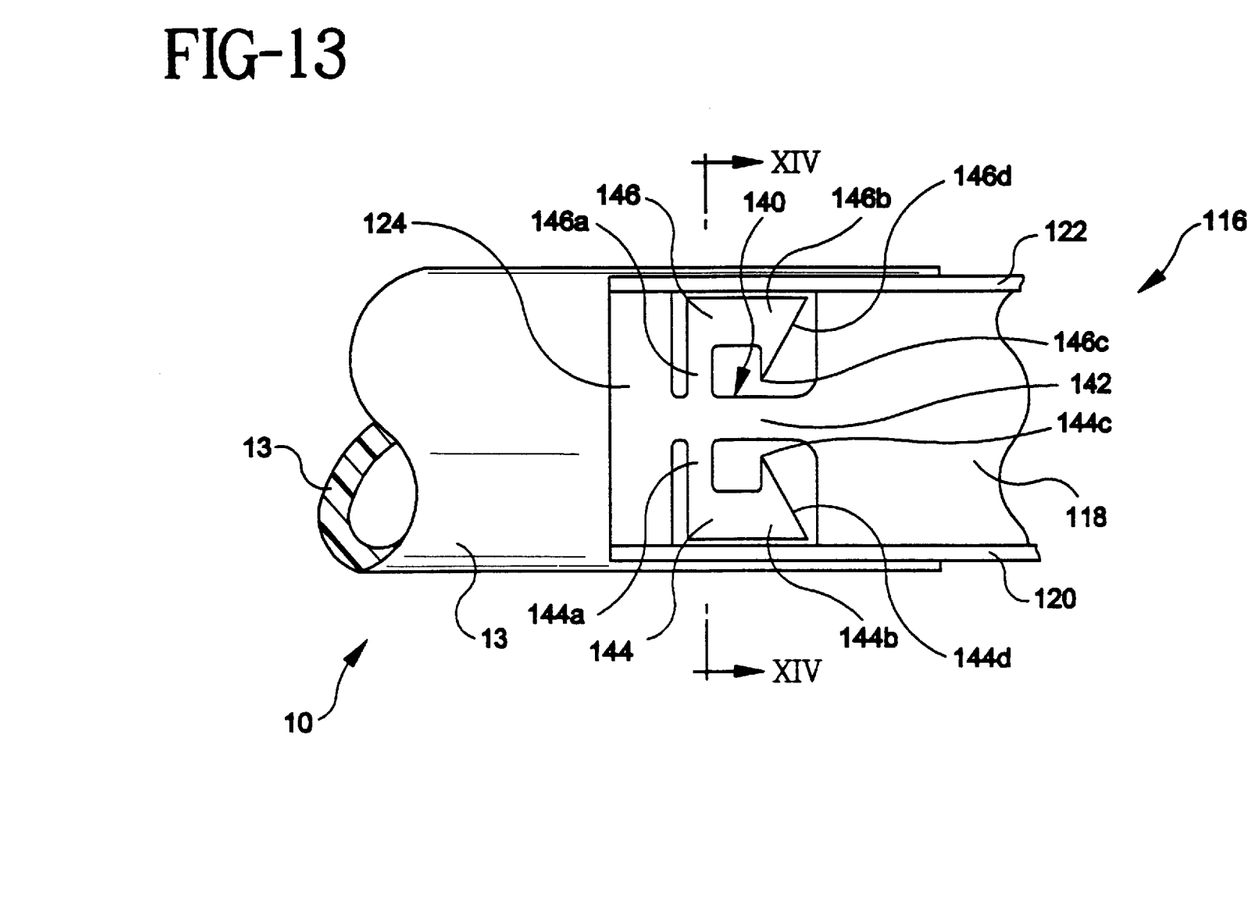
FIG. 13 is a top plan view of an end portion of the bond bar of FIG. 11 positioned over an extent of an electrical cable.
Figure 14:
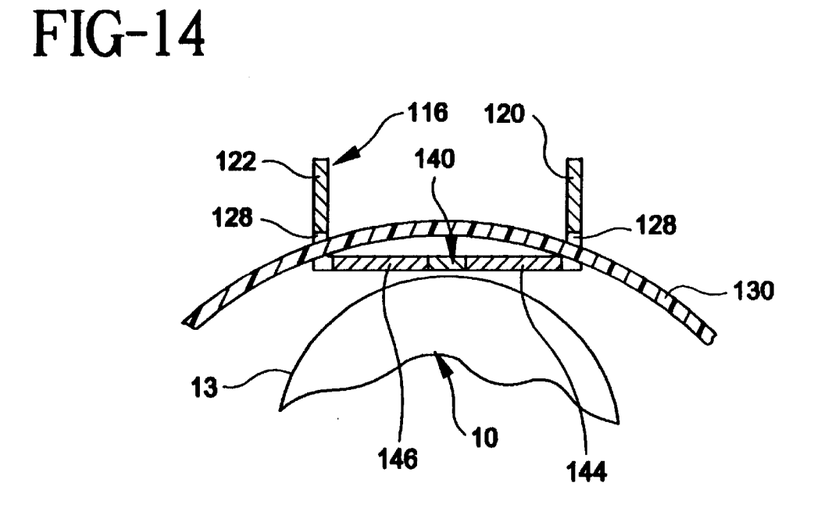
FIG. 14 is a vertical cross-section of the bond bar and cable combination shown in FIG. 13 taken through the lines XIV—XIV thereof.

Referring now to FIGS. 11–14, the present invention further provides an improved stabilizer or bond bar 116 which permits securement to cable 10 using plastic straps, such as cable ties, without risk of movement of the bond bar 116 over time. Bond bar 116 shown in FIGS. 11 and 12 is generally similar to stabilizer bar 16 shown in FIG. 2. Bond bar 116 is an elongate generally U-shaped channel member having a bottom surface 118 and a pair of elongate transversely opposed upstanding sidewalls 120 and 122. Bond bar 116 includes a pair of longitudinal ends one of which is shown in FIGS. 11–15 as end 124. Bond bar 116 further includes a plurality of apertures 126 longitudinally spaced along bottom surface 118. Apertures 126 permit attachment of conventional mounting hardware (not shown) which is used to electrically interconnect bond bar 116 to the metallic shield of cable 10 in a manner which is well known in the cable splicing art. Opposed sidewalls 120 and 122 include aligned longitudinal slots 128 therethrough adjacent ends 124. Slots 128 are positioned adjacent bottom surface 118 and provide for the accommodation of a conventional plastic cable tie 130 (FIG. 14).

Figure 15:
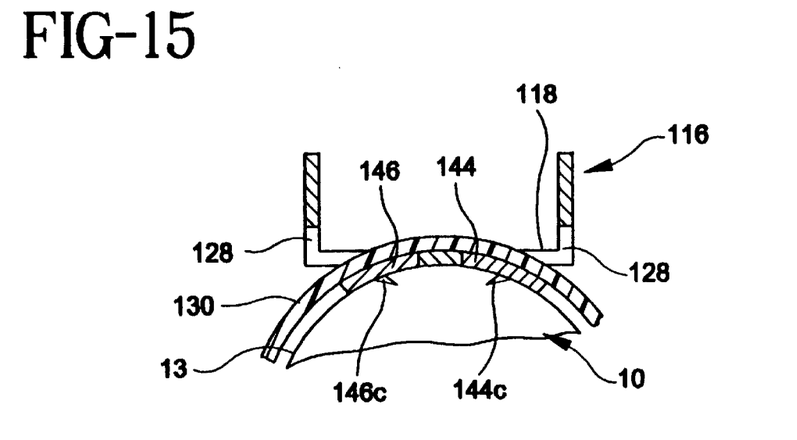
FIG. 15 is a vertical cross-section similar to FIG. 14, showing the bond bar attached to the electrical cable.

As further shown with respect to FIGS. 13–15, bond bar 116 may be secured to the jacket 13 of cable 10 adjacent the centrally located splice 14 (FIG. 2). In order to permit securement of bond bar 116 to cable jacket 13 and to prevent movement therebetween after the bond bar has been secured, especially over time, each end 124 of bond bar 116 includes a cable skiving element 140. Cable skiving element 140 is stamped from the bottom planar surface 118 adjacent end 124. Cable skiving element 140 includes a central elongate planar extent 142 extending generally in the longitudinal direction of bond bar 116. Skiving element 140 further includes a pair of oppositely directed generally L-shaped skiving members 144 and 146 extending from central extent 142. Skiving members 144 and 146 each include an elongate base 144a and 146a respectively, which extend transversely from central extent 142 and elongate arm portions 144b and 146b extending from bases 144a and 146a. The distal extents of arm portions 144b and 146b include inwardly directed pointed barbs 144c and 146c.

As shown in FIG. 14, prior to secure attachment to cable 10, the skiving element 140 lies in the plane of bottom surface 118 having been stamped therefrom. As the entire bond bar 116 is formed of generally deformable metal, the skiving element 140 may be deformed out from the plane of bottom surface 118 for engagement with the jacket 13 of cable 10. However, prior to such deformation, as the skiving element 140 lies in the plane of bottom surface 118, it does not impede the movement of the bond bar 116 along cable jacket 13. Thus, the bond bar may be moved along cable jacket 13 until the desired location is achieved at which point the plastic cable tie 130 is threaded through aligned slots 128 to overlie skiving element 140 and cable 10.

In conventional fashion, cable tie 130 may be tightened about cable 10. Such tightening causes the individual skiving members 144 and 146 to be deformed out from the plane of bottom surface 118 about central extent 142 downwardly into contact with cable jacket 13. Continued tightening of cable tie 130 causes further engagement of members 144 and 146 with plastic jacket 13. As the skiving members are supported in cantilevered fashion from central extent 142, the arm portions 144b and 146b make the initial engagement with cable jacket 13. Further tightening of cable tie 130 cause inwardly directed barbs 144c and 146c to further dig into the cable jacket 13. Such skiving or digging into the cable jacket resists movement of the bond bar 116 with respect to cable 10. The cable tie is then firmly tightened so as to firmly secure end 124 of bond bar 116 to cable jacket 13. During such tightening there may be some flattening of the cable jacket which further serves to embed the skiving members 144 and 146 into cable jacket 13.

Both longitudinal and axial movement of bond bar 116 with respect to cable jacket 13 is resisted as the skiving members 144 and 146 partially dig into the plastic cable jacket 13 especially at barbs 144c and 146c. Further skiving engagement in also achieved with jacket 13 along the forward tapered edges 144d and 146d of arm portions 144b and 146b. It is noted here that the skiving engagement of members 144 and 146 is sufficient to pierce into the cable jacket 13 but not entirely through the jacket itself so that while the bond bar 116 is securely retained on the cable jacket 13, the integrity of the jacket itself is not violated.

Prior to completion of the splice, the bond bar 116 may be insulated so as to prevent contact with the conductors of the splice. One technique which may be employed is to wrap the bond bar 116 with a spacer web of the type shown and described above with respect to FIG. 3.

The present invention provides advantages over other techniques used to secure ground members to cable jackets such as a ground member which includes extending spikes, teeth or other structures which dig into the cable jacket upon positioning thereon. The skiving structure of the present invention does not skive into the cable until after the bond bar 116 is properly positioned on the cable jacket and the cable tie is drawn around the cable. This allows the bond bar to be easily moved and relocated prior to final positioning.

In the preferred embodiment of the present invention bond bar 116 is shown in use in combination with an encapsulated cable splice enclosure (FIGS. 1–10). It however may be appreciated that use of the bond bar of the present invention is not limited thereto. The bond bar shown herein may be used in any splice application where mechanical and electrical continuity must be maintained across an electrical cable splice.

Various changes to the foregoing described and shown structures would now be evident to those skilled in the art. Accordingly, the particularly disclosed scope of the invention is set forth in the following claims.

What is claimed is:

1. A bond bar assembly for an electrical cable having a plurality of conductors extending through an insulative jacket with an exposed splice location defined between cable jacket ends, said assembly comprising:

an elongate conductive bond bar having opposed bond bar ends and a longitudinal central extent for spanning said splice location, each of said bond bar ends having a generally planar surface for engagement with said cable jacket ends; and radially contractable clamping members securable about said jacket ends and each said planar surface of said bond bar ends for securing said bond bar ends to said jacket ends;

said planar surfaces of said bond bar ends each including a first deflectable jacket skiving member deflectably movable from a first position in non-skiving engagement with a corresponding one of said cable jacket ends to a second position in skiving engagement with the corresponding one of said cable jacket ends upon radial contraction of a corresponding one of said clamping members.

2. A bond bar assembly of claim 1 wherein each said planar surface of each of said bond bar ends includes a second skiving member oppositely directed from said first skiving member.

3. A bond bar assembly of claim 2 wherein said bond bar is an elongate U-shaped channel member having an elongate bottom surface and opposed upwardly extending elongate sidewalls, each said planar surface of said bond bar ends being part of said bottom surface.

4. A bond bar assembly of claim 3 wherein said radially contractable members are cable ties.

5. A bond bar assembly of claim 4 wherein said sidewalls include aligned openings adjacent each of said bond bar ends for passage therethrough of said cable ties.

6. A bond bar assembly of claim 5 wherein said skiving members are stamped from each said planar surface.

7. A bond bar assembly of claim 6 wherein said skiving members extend in opposite directions from an elongate central support forming part of said bottom surface of said bond bar.

8. A bond bar assembly of claim 7 wherein each said skiving member further includes an elongate base extending outwardly perpendicularly from said central support towards one of said sidewalls, an elongate arm extending perpendicularly from said base generally parallel to said sidewalls, and an inwardly directed barb extending from said arm, said barb being adapted for said skiving engagement with said cable jacket.

9. A bond bar assembly of claim 8 wherein said arm includes a tapered distal edge inclusive of said barb for said skiving engagement with said cable jacket.

* * * * *